J. GODDARD.
CAMERA MOUNTING.
APPLICATION FILED JULY 3, 1918.
1,280,013.
Patented Sept. 24, 1918.
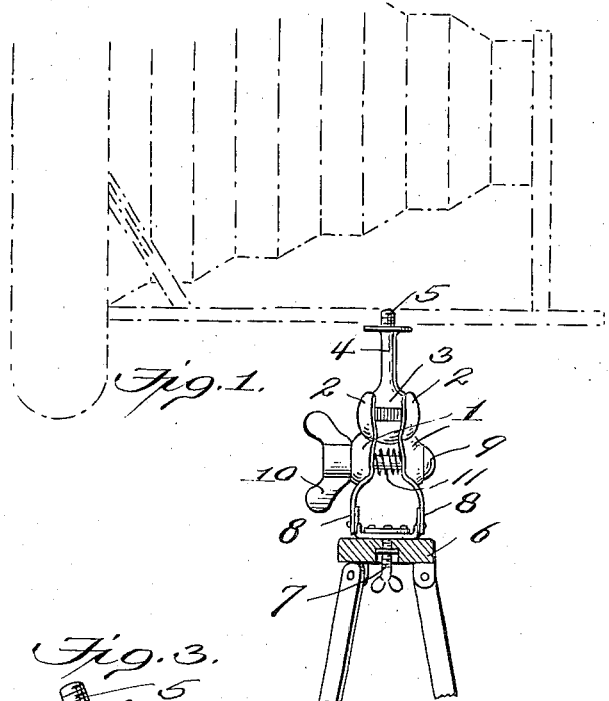
Fig. 1.
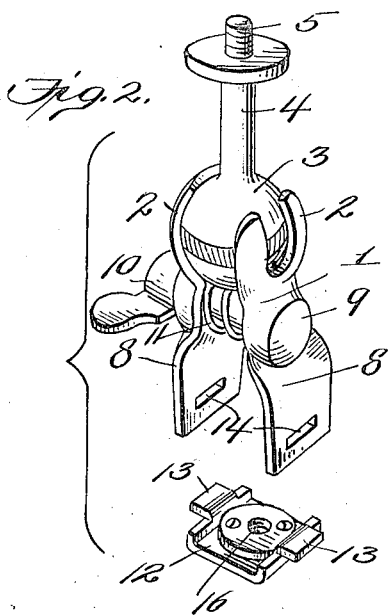
Fig. 2.
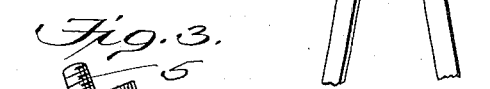
Fig. 3.
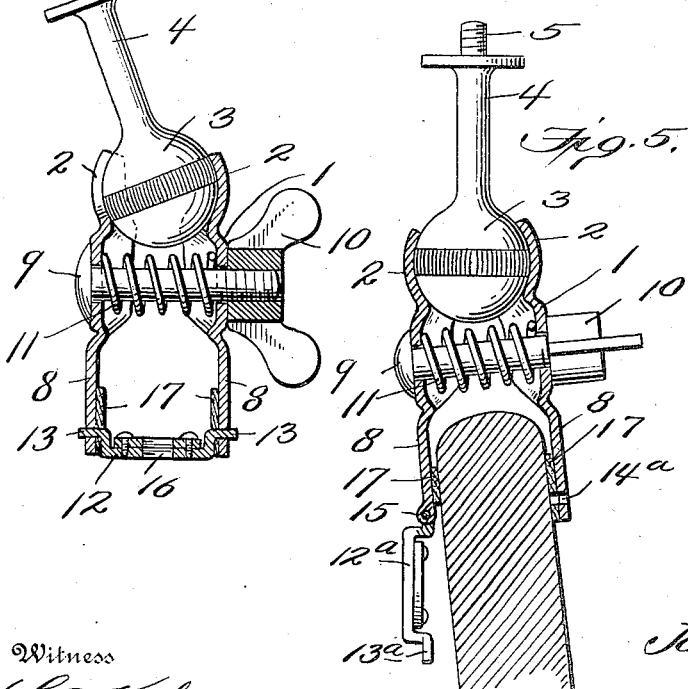
Fig. 4. Fig. 5.
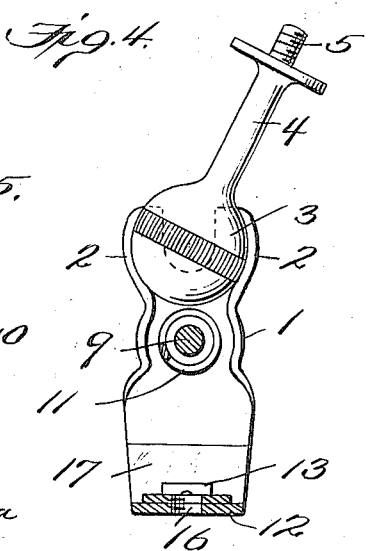
Witness
Inventor
Joseph Goddard
By
Attorney

UNITED STATES PATENT OFFICE.

JOSEPH GODDARD, OF ROCHESTER, NEW YORK, ASSIGNOR TO SENECA CAMERA MANUFACTURING COMPANY, OF ROCHESTER, NEW YORK, A CORPORATION OF NEW YORK.

CAMERA-MOUNTING.

1,280,013.

Specification of Letters Patent.

Patented Sept. 24, 1918.

Application filed July 3, 1918. Serial No. 243,154.

*To all whom it may concern:*

Be it known that I, JOSEPH GODDARD, a citizen of the United States, residing at Rochester, in the county of Monroe and State of New York, have invented new and useful Improvements in Camera-Mountings, of which the following is a specification.

The present invention relates to mountings for supporting photographic cameras while such cameras are used in the taking of pictures, and the primary object of the invention is to provide a novel and improved mounting of this character whereby the user of the camera is enabled to easily and quickly mount the camera on the usual tripod or equivalent stand and may with equal facility mount the camera on the back of a chair, a fence, or any other convenient support available in the absence of a tripod or in situations where a tripod or similar stand would be unsuitable for use, the mounting, according to the present invention, having the combined or dual capacity for attachment to the different kinds of supports such, for example, as those mentioned, thus not only avoiding the expense of providing individual mountings for the different supports, but also obviating the inconvenience of carrying different types of mountings.

To these and other ends, the invention consists in certain improvements, and combinations and arrangements of parts, all as will be hereinafter more fully described, the novel features being pointed out particularly in the claims at the end of the specification.

In the accompanying drawings:

Figure 1 is a side elevation of the improved mounting, the same being shown attached to a tripod for supporting a camera thereon.

Fig. 2 is a collective view showing the mounting in perspective, the auxiliary attaching member being shown detached.

Fig. 3 represents a section taken centrally and vertically through the mounting with the auxiliary attaching member in place.

Fig. 4 represents a section through the mounting and the auxiliary attaching member in a plane perpendicular to the plane of the section represented by Fig. 3.

Fig. 5 is a section similar to Fig. 3 showing, however, the auxiliary attaching member removed from the space between the clamping members, the latter being shown in clamping engagement with the back of a chair or similar object utilized as a support Similar parts are designated by the same reference characters in the several views.

The present invention provides a single mounting which is capable of use generally for supporting cameras which are usually adapted for attachment to a tripod or other similar stand, this single mounting enabling the camera to be universally mounted upon the usual tripod or other similar stand or upon the back of a chair, a fence, or any other object which the mounting is adapted to grip, thus utilizing such objects as a support. The preferred embodiments of the invention are shown in the accompanying drawings and will be hereinafter described in detail, but it is to be understood that the invention is not restricted to the precise constructions shown as equivalent constructions are contemplated and will be included within the scope of the claims.

The mounting, as shown, comprises a pair of clamping members 1 which are preferably composed of sheet metal of appropriate thickness and pressed into the desired form. Suitable means is provided for attaching the clamping members to a camera. Preferably, and as shown, these clamping members have complemental sockets 2 toward their upper ends to receive a spherical head 3, the spherical head 3 having a stem 4 projecting radially therefrom, the upper end of this stem being threaded, as at 5, to enter one of the threaded sockets which is usually provided on cameras for the reception of a tripod screw, the tripod 6 shown in Fig. 1 having such a screw 7. The lower ends of the clamping members are appropriately shaped to provide spaced gripping jaws 8, the spacing of these jaws and the range of movement of the clamping members being so determined as to enable the jaws to receive and grip between them an ordinary chairback, a fence, or similar objects. The back of an ordinary chair is shown gripped between the jaws in Fig. 5, it being understood that other objects when utilized as a support would be engaged and gripped in a similar way. As shown, a bolt 9 extends through the clamping members at a point intermediate their length, a wing nut 10 coöperating with the bolt. Rotation of this wing nut in one direction will draw the clamping members toward one another and when an object is gripped between the jaws 8 the spherical head 3 in the sockets 2 will be simultaneously gripped between the opposite ends of the clamping members. To facilitate detachment of the clamping members from a support or to effect automatic separation of the clamping members when the bolt connecting them is loosened, a compression spring 11 may be interposed between the clamping members, a coiled compression spring which encircles the bolt being shown in the present instance.

The mounting thus far described would be capable of attachment to objects only by clamping such objects between the jaws. To enable the mounting to be attached with equal facility to a tripod or similar stand, an auxiliary attaching member is provided which, when the mounting is to be applied to a tripod or similar stand, is introduced into the space between the jaws and is clamped or held in such position, this auxiliary attaching member being adapted for attachment to the usual tripod or stand, it being understood that the auxiliary attaching member is moved out of the space between the jaws of the clamping members when the mounting is to be attached to an object by gripping such object between the jaws. The auxiliary attaching member 12 may, as shown in Figs. 2 and 3, be made separable or detachable from both jaws, in which case it is provided with lugs 13 which project from its opposite sides, these lugs being adapted to fit into recesses 14 formed in the jaws 8, or the attaching member may, as shown in Fig. 5, be connected along one of its edges to one of the jaws of the mounting in such a way that it may swing into and out of the space between the jaws, the clamping member 12ª in the latter instance being shown hinged, at 15, to the lower edge of one of the jaws while the opposite or free edge of the member 12ª has a projection lug 13ª adapted to fit into the recess 14ª in the respective jaw. In both embodiments of the invention, the auxiliary attaching member has a threaded socket 16 adapted to receive the screw 7 upon the tripod or stand whereby the under side of the auxiliary attaching member is drawn firmly into engagement with the top of the tripod or stand and is held in such position.

In using a camera mounting constructed as hereinbefore described, the mounting is attached to the camera through the medium of the threaded portion of the stem 4, and in those instances where the mounting is to be applied to a chairback, fence, or other object to serve as a support, the auxiliary attaching member is removed from its position between the jaws and the latter are brought into straddling relation with the object, after which the wing nut 10 is rotated to tighten the bolt, in consequence of which the jaws are caused to firmly clamp the object, and by the same operation the sockets 2 grip the spherical head 3 attached to the camera whereby the camera is held in the desired position. Where the mounting is to be applied to a tripod or similar stand, the auxiliary attaching member is introduced into the space between the jaws, and tightening of the bolt connecting the clamping members causes the auxiliary attaching member to be firmly held between the jaws, and by the same operation as before the spherical head 3 attached to the camera is gripped, thus holding the camera in the desired position. The mounting may then be applied to the top of the tripod, the mounting resting on the auxiliary attaching member, and the tripod screw may then be introduced into the socket in the auxiliary attaching member and tightened. The spherical ball and socket connection between the clamping members and the camera is preferable as it enables the camera to be supported at any desired angle, although it will be understood that other suitable means may be employed for connecting the mounting to the camera. If desired, pads 17 of felt or other suitable material may be attached to the inner or gripping faces of the jaws to avoid marring of furniture or other objects to which the mounting is applied.

I claim as my invention:

1. A mounting for cameras comprising coöperative spaced jaws having means for attaching them to a camera and adapted to clamp a support in the space between them, and a member adapted to fit into said space between the jaws and adapted for attachment to another support of a different character.

2. A mounting for cameras comprising coöperative clamping members adapted to grip a support between them, and an attaching member movable into and out of the space between said clamping members and capable of attachment to the top of a tripod.

3. A mounting for cameras comprising coöperative clamping members having means for attaching them to a camera and having jaws adapted to grip a support between them, and an attaching member movably related to both jaws and adapted to be gripped and held in a position between said jaws.

4. A mounting for cameras comprising a pair of clamping members having means at one end for attaching them to a camera and having jaws at their opposite end adapted to grip a support between them, and a member movable into the space between said jaws and adapted for attachment to a support.

5. A mounting for cameras comprising a pair of coöperative clamping members having spaced jaws adapted to receive and grip a support between them, and an attaching member adapted to fit into said space between the jaws and to be clamped in such position by the jaws.

6. A mounting for cameras comprising coöperative spaced jaws, and a member movable into and out of the space between the jaws, said member being adapted for attachment to a tripod, and said jaws being operative to grip and hold said member between them.

7. A mounting for cameras comprising coöperative clamping members spaced to straddle and grip a support of one kind, and an attaching member movable into a position between said clamping members and adapted for attachment to a support of another kind.

8. A mounting for cameras comprising coöperative clamping members adapted to straddle and grip an object to serve as a support, and an attaching member movable into a position to be gripped and held by said clamping members and having a socket for attachment to a tripod.

9. A mounting for cameras comprising a spherical head having a screw-threaded stem for attachment to a camera, a pair of clamping members having jaws at one end engaging the spherical head, and jaws at their opposite end for engaging a suitable support between them, an attaching member movable into a position to be held and gripped by said clamping members and having a socket with screw-threaded walls and a surface about the socket for coöperation with a tripod head.

10. The combination of a tripod having a screw mounted thereon, and a camera mounting comprising a pair of clamping members having means for attachment to the camera and also having jaws for engaging a suitable support between them, and an attaching member movable into a position to be held and gripped by said clamping member and having a threaded socket adapted to be engaged by the screw of the tripod and thereby drawn into engagement with the tripod.

In testimony whereof I have hereunto set my hand in presence of two subscribing witnesses.

JOSEPH GODDARD.

Witness:
ANNABELLE MUTRIE,
ANGELA BUCK.